United States Patent [19]
Ishikawa et al.

[11] 3,793,775
[45] Feb. 26, 1974

[54] SIZING DEVICE
[75] Inventors: Mineo Ishikawa; Seiichi Oikawa, both of Kariya, Japan
[73] Assignee: Toyoda Koki Kabushiki Kaisha, Karsha, Kariya-shi, Aichi-ken, Japan
[22] Filed: Nov. 29, 1971
[21] Appl. No.: 202,868

[30] Foreign Application Priority Data
Dec. 3, 1970 Japan............................ 45/107053

[52] U.S. Cl.......... 51/165.77, 33/147 N, 33/178 E, 51/165.91
[51] Int. Cl.. B24b 49/04, B24b 51/00, G01b 19/12
[58] Field of Search.........33/143 E, 143 L, 147 R, 33/147 E, 147 H, 149 J, 172 E, 174 L, 33/178 R, 178 E; 51/165.77, 165.83, 165.91

[56] References Cited
UNITED STATES PATENTS
| | | | |
|---|---|---|---|
| 2,249,904 | 7/1941 | Lewis | 33/178 R |
| 2,745,184 | 5/1956 | Kasparson | 33/178 R |
| 2,869,243 | 1/1959 | Byrkett et al. | 33/178 R |
| 2,984,953 | 5/1961 | Neal | 33/143 L X |
| 3,688,411 | 9/1972 | Asano et al. | 33/147 N X |

*Primary Examiner*—John W. Huckert
*Assistant Examiner*—John M. Jillions
*Attorney, Agent, or Firm*—Oblon, Fisher, Spivak, McClelland & Maier

[57] ABSTRACT

A sizing device for a grinding machine is provided with a pivotal member which is pivotally mounted on a supporting member which moves horizontally toward and away from a workpiece. The pivotal member pivotally mounts a measuring head at the front end thereof in such a manner that the measuring head is urged toward the workpiece by the eccentricity of gravity thereof. A contact member is mounted between a pair of upper and lower measuring feelers for making contact with the surface of the workpiece opposite to a grinding wheel. A spring is mounted between the supporting member and the rear end of the pivotal member for urging the lower measuring feeler, mounted on the measuring head, upwardly toward the workpiece. The pivotal center of the measuring head is in a plane which passes through the points of contact of the measuring feelers with the workpiece.

9 Claims, 6 Drawing Figures

3,793,775
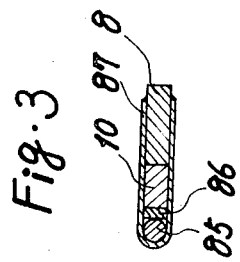
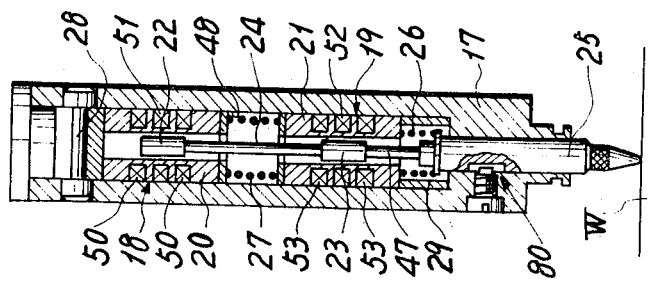
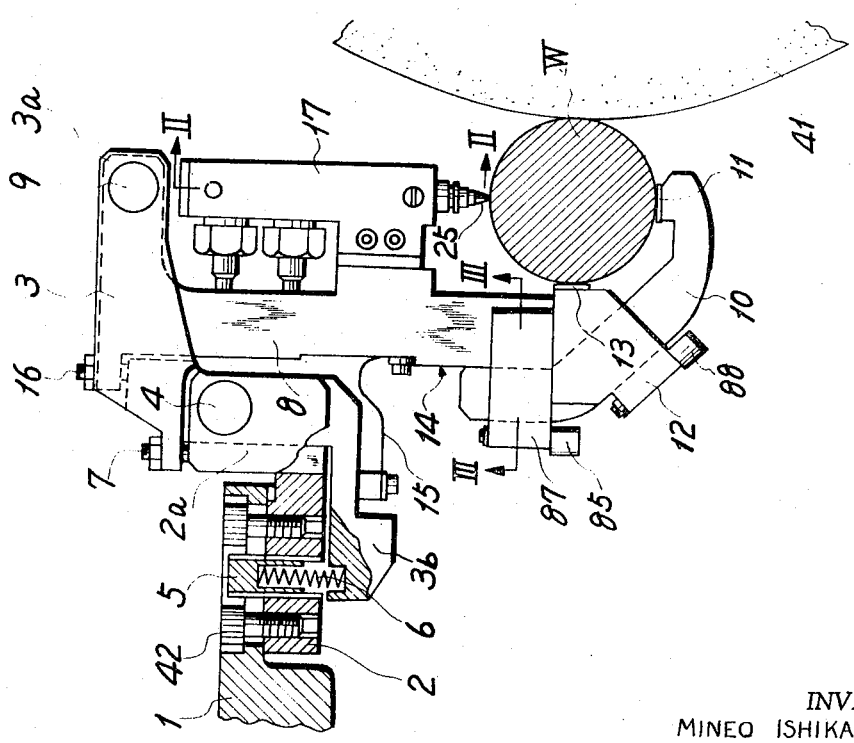
INVENTORS
MINEO ISHIKAWA
SEIICHI OIKAWA
BY Oblon, Fisher and Spivak
ATTORNEYS

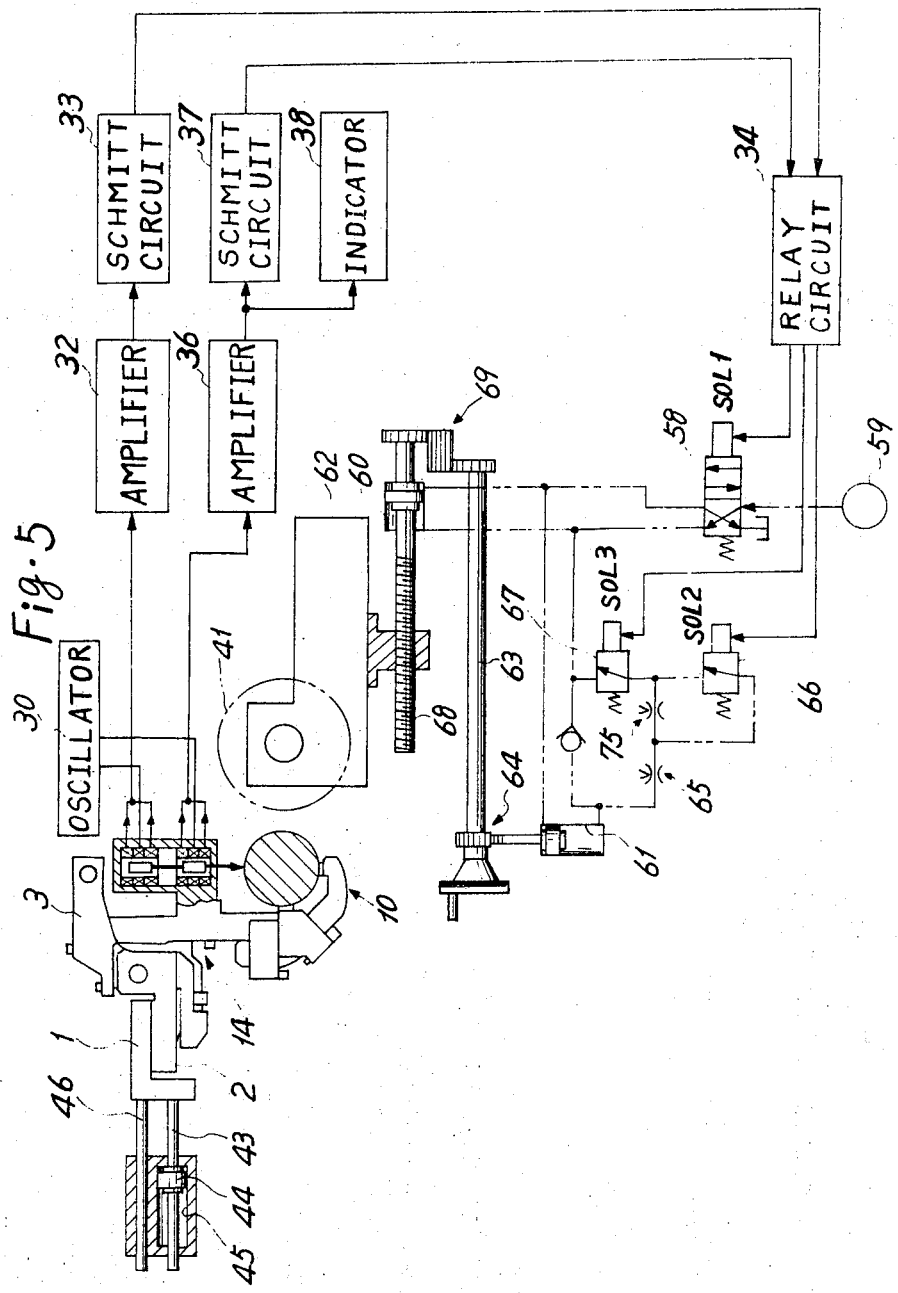

SIZING DEVICE

BACKGROUND OF THE INVENTION

1. Field of the Invention

The present invention generally relates to sizing devices suitable for grinding machines, and more particularly to a sizing device of the "three point-contacting type" wherein a workpiece to be diametrically measured is embraced by and is held in contact engagement by three contacting members or measuring feelers.

2. Description of the Prior Art

Conventionally, sizing devices can generally be divided into three types, namely, the "one point-contacting type" wherein a workpiece is measured by measuring the engagement with one measuring feeler, the "two point-contacting type" wherein a pair of measuring feelers are provided in contact with diametrically opposed portions of a workpiece to measure the diameter of the workpiece, and the "three point-contacting type". In the conventional sizing devices mentioned above, a measuring head is pivotally mounted on a supporting member so that the measuring feelers (particularly in the two point-contacting type) are rotated about the pivotal center of the measuring head without any parallel movements being made to the workpiece therebetween in response to their engagement with the workpiece. As a result of the above, an accurate measurement cannot be effected because of the dead stop position of the measuring head. Although the above-described disadvantage of the two point-contacting type sizing devices is resolved to a certain degree by the provision of a contact engagement having three contacting members, certain disadvantages still remain with the three point-contacting type measuring device with respect to measuring accuracy and mounting space. Thus, in the three point contacting type device, the measuring head is mounted so as to be rotated downwardly toward and upwardly away from the workpiece before and after a measuring operation. As such it is difficult to use the three point-contacting type sizing device in a grinding machine having an automatic workpiece-loading device in which a workpiece is generally moved downwardly toward and upwardly away from a grinding position and to provide a stable measuring pressure with the measuring feelers thereof because of the engaging situation of the contacting members with the workpiece.

Moreover, with the rapid progress taking place in the field of high-speed grinding machines, the amount of metal or the like being removed from a workpiece is large and it is possible to directly grind a workpiece during a first machining step without the need for a prior turning step. As such, a need exists even more than before for the provision of measuring feelers which can accurately follow a change in the workdiameter with a stable measuring pressure to enable the workdiameter to be accurately measured over a wide range of sizes.

SUMMARY OF THE INVENTION

It is therefore an object of the present invention to provide a new and improved unique sizing device which is capable of accurately measuring a workdiameter.

It is another object of the present invention to provide a new and improved unique sizing device having measuring feelers which accurately follow any change in the workdiameter with a stable measuring pressure.

It is yet another object of the present invention to provide a new and improved sizing device which is suitable for a high-speed grinding machine and which can accurately measure a workdiameter over a wide range of sizes.

Still another object of the subject invention is to provide a new and improved useful sizing device having a pair of displacement detectors, one of which is suitable for linearly measuring a work-diameter over a wide range of sizes to thereby enable the remaining metal to be removed to be detected for determining the amount of finish grinding required and the other of which is adequate for accurately measuring the workdiameter to detect the finished size of the workpiece.

One further object of the present invention is to provide a new and improved simple and compact sizing device which is suitable for a grinding machine having an automatic workpiece loading device and which is horizontally moved toward and away from a workpiece so as to bring three measuring feelers into measuring engagement with the workpiece.

Briefly, according to the present invention, these and other objects are achieved by providing a sizing device which includes a supporting member, a measuring head pivotally mounted on the supporting member, and a pair of upper and lower measuring feelers mounted on the measuring head so as to accurately make contact with diametrically opposed portions of a workpiece to thereby enable the diameter of the workpiece to be measured. The supporting member is horizontally moved toward and away from the workpiece in order to bring the measuring feelers into measuring engagement with the workpiece. Additionally, a pivotal member is pivotally mounted on the supporting member and has a front and a rear extension on both sides of its pivotal center. The measuring head is pivotally mounted on the front extension at the end thereof in a manner such that the measuring head is urged toward the workpiece by the eccentricity of gravity thereof. A spring is mounted between the supporting member and the rear extension for urging a lower measuring feeler upwardly toward the workpiece. A contact member is mounted on the measuring head so as to make contact with a surface of the workpiece opposite to a grinding wheel. A detecting device is then provided for detecting the relative displacement between the pair of upper and lower measuring feelers.

BRIEF DESCRIPTION OF THE DRAWINGS

The forgoing and other objects of the present invention will be more fully appreciated as the same becomes better understood from the following detailed description of a preferred embodiment when considered in connection with the accompanying Drawings, in which:

FIG. 1 is a fragmentary sectional view showing a sizing device;

FIG. 2 is an enlarged sectional view taken along the line II—II of FIG. 1;

FIG. 3 is a sectional view taken along the line III—III of FIG. 1;

FIG. 5 is a schematic view showing a control system having a sizing device in accordance with the preferred embodiment of the present invention; and, FIG. 6 is a relay circuit suitable for the control system of FIG. 5.

DETAILED DESCRIPTION OF THE PREFERRED EMBODIMENT

Figure 4:
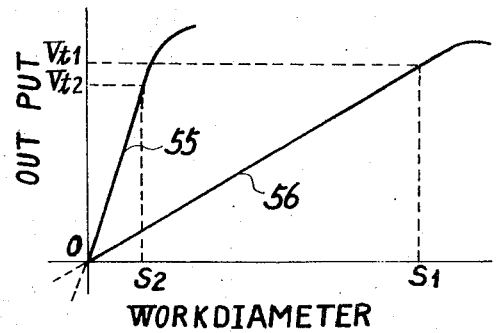
FIG. 4 is a schematic view showing characteristic curves of the output of the displacement detectors in accordance with the present invention.

Referring now to the Drawings, wherein like reference numerals designate identical, or corresponding parts throughout the several views, and more particularly to FIG. 5 thereof, wherein a carriage 1 is shown as being secured to a piston rod 43 of a piston 44, which is slidably received in a cylinder 45 formed on a bracket. The carriage 1 is guided by a guide bar 46 which is slidably mounted on the bracket. As shown in FIG. 1, a supporting member 2 is adjustably mounted on the carriage 1 by bolts 42. A forked portion 2a is formed on the right portion of the supporting member 2 to enable a pivotal member 3 to be pivotally mounted thereon by a pin 4. The pivotal member 3 has a forked portion 3a formed on the right portion thereof. An L-shaped member 8 is pivotally mounted on the forked portion 3a by a pin 9 which is located in a vertical plane that passes through the center of a workpiece W. A U-shaped plate 87 is secured on a lower extension of the L-shaped member 8 so as to adjustably hold a measuring feeler 10 therein. As shown in FIG. 3, the measuring feeler 10 is clamped by the rotation of an eccentric pin 85 through a spacer 86. The lower contact member 11 is secured to an end of the measuring feeler 10 so as to make contact with a lower surface of the workpiece W in the vertical plane which passes through the center of the workpiece W. A U-shaped plate 12 is adjustably fixed by an eccentric pin 88 such that a contact member 13 may make contact with the back or left surface of the workpiece W and be positioned diametrically opposite to a grinding wheel 41. The contact member 13 is adjustably mounted on the measuring feeler 10 in a manner such that the lower measuring feeler 10 and an upper measuring feeler 25 may accurately make contact with diametrically opposed portions of the workpiece W. The points of contact of the measuring feelers 10 and 25 with the workpiece W is on a vertical plane which passes through the pivotal center of the L-shaped member 8.

A spring 6 is disposed between the rear or left portion 3b of the pivotal member 3 and a cap 5 which is threaded with the supporting member 2. The pivotal member 3 will have a counterclockwise moment about the pin 4 by the force of the spring 6. The limit of counterclockwise rotation is adjustably restrained by the engagement of a bolt 7 which is threadedly engaged with the pivotal member 3 and with the forked portion 2a. A measuring head 14 which includes the L-shaped member 8 and a detecting body 17 is provided with a moment about the pin 9 and toward the workpiece W due to the eccentricity of the center of gravity thereof. In addition, a flat spring 15 is disposed between the lower extension of the L-shaped member 8 and the rear portion 3b of the pivotal member 3 to assist the aforementioned moment due to gravity. The limit of counterclockwise rotation of the sizing head 14 is restrained by the engagement of a bolt 16 on the L-shaped member 8 with the shoulder of the pivotal member 3. Accordingly, it should be understood that suitable measuring pressure is rendered to the front contact member 13 by the moments due to the gravity of the measuring head 14 and the force of the flat spring 15. Moreover, it should be further understood that a suitable measuring pressure for the contact member 11 is rendered by the moment due to the force of the spring 6.

The detecting body 17 is adjustably mounted on the L-shaped member 8. As shown in FIG. 2, two differential transformers 18 and 19 are vertically mounted within the detecting body 17 in a spaced relationship and in series. The differential transformers 18 and 19 each have different respective output characteristics. Moreover, each of the differential transformers 18 and 19 includes a respective bobbin 20 and 21 which is slidably mounted in an axial bore 48 formed on the detecting body 17, a primary and a secondary coil wound on the peripheral grooves of the bobbins 20 and 21 and a respective core 22 and 23 movably disposed within the bobbins 20 and 21 in a concentrical relationship with the primary and secondary coils. The cores 22 and 23 are connected to each other through a connecting rod 24. The upper measuring feeler 25 is slidably mounted on the lower portion of the detecting body 17 and is restrained against rotation by a key-engagement 80. A connecting rod 47 is provided for connecting the lower core 23 to the upper measuring feeler 25. The upper measuring feeler 25 is downwardly urged by a spring 26 which is disposed between the flange thereof and the lower end of the bobbin 21 so as to be brought into a contacting engagement with the upper periphery of the workpiece W. A spring 27 is disposed between the bobbins 20 and 21 to upwardly urge the bobbin 20 of the second differential transformer 18 into a contacting engagement with a cam 28 which is rotatably mounted on the top of the detecting body 17. The bobbin 21 of the first differential transformer 19 is downwardly urged by the spring 27 into an abutting engagement with a spacer 29 which is mounted on the lower end of the bore 48. Thus, it is seen that each of the differential transformers 18 and 19 are adjustably positioned in the detecting body 17 so as to respectively enable the relative positional relationships between the coils and the cores of the differential transformers 18 and 19 to be adjusted as described hereinafter. The adjusting operation of the first differential transformer 19 is performed by axially moving the detecting body 17 relative to the core 23 by a suitable amount. With respect to the second differential transformer 18, the bobbin 20 having coils 50 and 51 is axially moved relative to the core 22 by adjusting the rotation of the cam 28.

A detailed description of the differential transformers 18 and 19 will not be given since the same are well known to those skilled in the art, and a detailed description is unnecessary for the purposes of this invention. When the primary coils 51 and 52 are energized by a suitable oscillator 30, as shown in FIG. 5, respective outputs will appear at the output terminals of secondary coils 50 and 53 in accordance with the amount of displacement of the cores 22 and 23 relative to the bobbins 20 and 21. The second differential transformer 18 is constructed so as to provide a large change in the ratio of the output to the amount of relative displacement between the core 22 and the coils 50 and 51, as shown by the large incline or gain the characteristic curve 55 of FIG. 4. Such a construction enables the second differential transformer 18 to measure any change in the workdiameter with a high sensitivity and accuracy. As shown in FIG. 5, the output voltage generated at the secondary coils 50 of the second differential transformer 18 is applied for amplification to an amplifier 32. The amplified output is then applied to a Schmitt trigger circuit 33, wherein a trigger voltage $Vt_2$ is preset so that an output therefrom will be transmitted to a relay circuit 34 when the workdiameter reaches a desired finish size. Differing from the second differential transformer 18, the first differential transformer 19 is constructed so as to enable measurement of changes in the workdiameter over a wide range of sizes to be obtained, as shown by the smaller incline or gain of the characteristic curve 56 of FIG. 4. Thus, it is clear that the first differential transformer 19 is not adapted to detecting relative displacement between the core 23 and the coils 52 and 53 with high sensitivity, but is adapted to detect displacement over a wide range of sizes. The output voltage generated at the secondary coils 53 of the first differential transformer 19 is applied to an amplifier 36. The amplified output voltage is then applied to a Schmitt trigger circuit 37, wherein a trigger voltage $Vt_1$ is preset so that a sizing signal may be transmitted therefrom to the relay circuit 34 when the workpiece W is ground to a predetermined size such that an amount of metal has been removed and an amount for the finish grinding will remain. The amplified output from the amplifier 36 is also applied to a conventional indicator 38 which serves to indicate the amount of metal removed during grinding.

Figure 6:
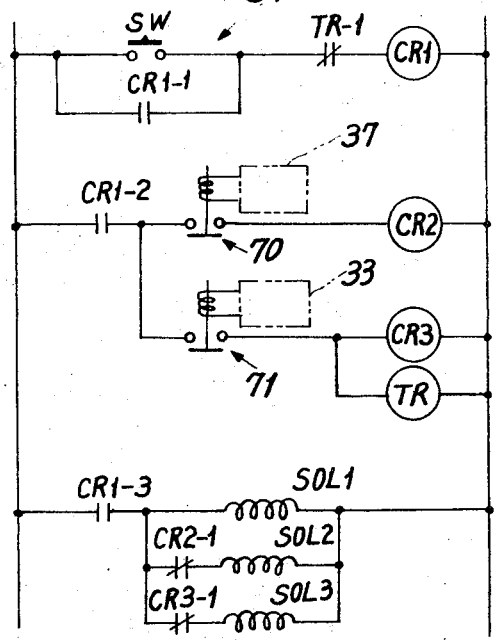

With reference now to FIGS. 5 and 6, the operation of grinding a workpiece to a large depth at a very high grinding speed by a grinding wheel 41 will be described.

Initially, a switch SW is operated for starting the grinding operation. A relay CR1 is energized in accordance with the closing of the switch SW and is maintained in energization by a self-holding contact CR1-1 of the relay CR1. Contacts CR1-2 and CR1-3 are simultaneously closed by the relay CR1 and thus energize solenoids SOL1, SOL2 and SOL3. A change-over valve 58 is shifted to the left by the solenoid SOL1 to thereby connect a fluid pressure source 59 to cylinders 60 and 61. A wheel slide 62 is moved toward the workpiece at a rapid rate in accordance with fluid applied under pressure to the right chamber of the cylinder 60. In accordance with the movement of the wheel slide 62, the grinding wheel 41 is fed to a position just before making contact with the workpiece W. In addition, fluid will be applied under pressure to the upper chamber of the cylinder 61 to rotate a shaft 63 by a conventional rack and pinion driving mechanism 64. Rotation of the shaft 63 is transmitted to a feed screw 68 through a gearing 69. The fluid discharged from the cylinder 61 flows to a reservoir through a throttle 65, shut-off valves 66 and 67, which are opened by the energization of solenoids SOL2 and SOL3, and the change-over valve 58, to thereby feed the grinding wheel 41 at a reduced speed for rough grinding which is defined by the throttle 65.

The sizing device is then moved by operation of the piston 44 to the sizing position. In the sizing position, the pair of contact members 11 and 25 are resiliently urged toward one another to thereby embrace the workpiece W at diametrically opposite portions thereof, as is clearly shown in FIGS. 1 and 5. Since the contact members 11, 13 and 25 will follow any decrease in the workdiameter, it should be understood that each of the differential transformers 18 and 19 and each of the cores 22 and 23 will be relatively shifted in accordance with any decrease in the workdiameter. As the rough grinding operation progresses, the workpiece to be ground will be reduced in diameter to a value which is slightly greater than the desired finish size and the output voltage of the first differential transformer 19 will approach the trigger voltage $Vt_1$ of the Schmitt trigger circuit 37. When the grinding operation has progressed to a point where only the finishing depth to be ground is left on the workpiece then an output will be produced by the Schmitt trigger circuit 37 to thereby close a contact 70 shown in FIG. 6. In accordance with the closing of the contact 70, the relay CR2 will be energized to thereby open a normally closed contact CR2-1 and thus de-energize the solenoid SOL2. The shut-off valve 66 will be closed by the de-energization of the solenoid SOL2, such that the discharged fluid of the cylinder 61 will flow to the reservoir through two throttles 65 and 75, the shut-off valve 67, and the change-over valve 58. The feed speed of the grinding wheel 41 will then be changed from a first reduced speed to a second and further reduced speed which is defined by the fine grinding throttle 75. As the grinding operation progresses further, eventually an output will be generated from the Schmitt trigger circuit 33, whereby a contact 71 will be closed to energize a relay CR3 and a timer relay TR. A normally closed contact CR3-1 will then be opened to thereby de-energize the solenoid SOL3 and thus shut-off the valve 67 to stop any further feed movements of grinding wheel 41. The timer relay TR operates to open a normally closed contact TR-1 after a preset interval of time and to thereby deenergize the relay CR1 and open the contact CR1-3. The solenoid SOL1 is then returned to its normal position. Accordingly, the wheel slide 62 will be moved rearwardly at a rapid speed after the occurrence of the conventional timed spark-out operation defined by the timer relay TR.

Although certain specific embodiments of the present invention have been shown and described, it is obvious that many modifications and variations thereof are possible in light of the above teachings. It is to be understood, therefore, that within the scope of the appended claims, the invention may be practiced otherwise than as specifically described herein.

What is claimed as new and desired to be secured by Letters Patent of the United States is:

1. A sizing device for controlling the feed movement of a wheel head in accordance with reduction in diameter of a workpiece, comprising:
   a supporting member;
   an actuator for horizontally moving said supporting member toward and away from said workpiece;
   a pivotal member pivotally mounted on said supporting member, said pivotal member having front and rear extensions on both sides of the pivotal center thereof;
   a measuring head pivotally mounted on the end of said front extension and positioned under said front extension so as to be urged toward said workpiece by the eccentricity of the center of gravity thereof;
   a pair of upper and lower measuring feelers mounted on said measuring head so as to make contact with diametrically opposed portions of said workpiece under the pivotal center of said measuring head;

a contact member mounted on said measuring head so as to make contact with a surface of said workpiece which is opposite to said grinding wheel;

means mounted between said supporting member and said rear extension for lifting said lower measuring feeler into engagement with said workpiece by urging said rear extension downwardly;

means mounted on said measuring head for urging said upper measuring feeler downwardly toward said workpiece;

first means for measuring the diameter of said workpiece over a relatively wide range and for generating a first voltage signal proportional to the diameter of said workpiece;

second means for measuring the diameter of said workpiece over a relatively small range and for generating a second voltage signal proportional to the diameter of said workpiece;

means for detecting a first predetermined voltage level of said first voltage signal and a second predetermined voltage level of said second voltage signal; and switching means responsive to the outputs of said detecting means for controlling the feed movement of said wheel head.

2. A sizing device according to claim 1, wherein said upper measuring feeler is slidable along a vertical plane which passes through an axis of said workpiece and wherein said lower measuring feeler is adjustably secured to said measuring head.

3. A sizing device according to claim 1, wherein the pivotal center of said measuring head is on a vertical plane which passes through the points of contact of said measuring feelers with said workpiece.

4. A sizing device according to claim 1, which further comprises means mounted between said pivotal member and said measuring head for urging said contact member toward said workpiece.

5. A sizing device according to claim 1, in which said first measuring and generating means comprises a first differential transformer connected to said upper measuring feeler for providing a first output voltage change with respect to a predetermined unit displacement of said upper measuring feeler for a first range of the workpiece diameter change, and said second measuring and generating means comprises a second differential transformer connected to said upper measuring feeler for providing a second output voltage change which is larger than said first output voltage change with respect to the predetermined unit displacement of said upper measuring feeler for a second range of the workpiece diameter change which is narrower than said first range thereof.

6. A sizing device according to claim 1, which further comprises an eccentric cam rotatably mounted on said measuring head for adjusting the position of said second measuring and generating means with respect to said first measuring and generating means.

7. A sizing device according to claim 1 wherein said means for detecting first and second voltage levels comprises first and second Schmitt triggers, respectively.

8. The sizing device according to claim 7 wherein said switching means comprises means for slowing the feed movement of said wheel head upon the receipt of the output of said first Schmitt trigger and means for stopping and reversing the feed movement of said wheel head upon the receipt of the output of said second Schmitt trigger.

9. A sizing device for controlling the feed motion of a wheel head in accordance with the reduction in diameter of a workpiece, comprising:

supporting means;

a measuring head pivotally mounted on said supporting means so as to be urged toward said workpiece by the eccentricity of the center of gravity thereof;

a pair of upper and lower measuring feelers mounted on said measuring head so as to make contact with diametrically opposed portions of said workpiece under the pivotal center of said measuring head;

a contact member mounted on said measuring head so as to make contact with a surface of said workpiece which is opposite to said grinding wheel; and a pair of electrical displacement detectors mounted on said measuring head for detecting relative displacement between said pair of upper and lower measuring feelers, one of said displacement detectors being for providing a first output voltage change with respect to a predetermined unit displacement of said upper measuring feeler for a first range of the workpiece diameter change in order to detect a remaining amount of material to be removed from said workpiece during a grinding operation and the other of said displacement detectors for providing a second output voltage change which is larger than said first output voltage change with respect to the predetermined unit displacement of said first feeler for a second range of the workpiece diameter change which is narrower than said first range thereof in order to accurately detect a finished size of said workpiece, means for sensing a first voltage level of said first output change for indicating the remaining amount of material to be removed, means for sensing a second voltage level of said second output change for indicating a finished size of said workpiece, and switch means responsive to the output of said sensing means for controlling the feed movement of said wheelhead.

* * * * *